United States Patent
Nozaki et al.

(10) Patent No.: US 7,341,205 B2
(45) Date of Patent: Mar. 11, 2008

(54) FUEL INJECTION NOZZLE FOR DME FUEL, AND DIESEL ENGINE INCLUDING THE FUEL INJECTION NOZZLE FOR DME FUEL

(75) Inventors: Shinya Nozaki, Higashi-Matsuyama (JP); Toshifumi Noda, Higashi-Matsuyama (JP); Daijo Ushiyama, Higashi-Matsuyama (JP); Yukihiro Hayasaka, Higashi-Matsuyama (JP)

(73) Assignee: Bosch Automotive Systems Corporation, Tokyo (JP)

( * ) Notice: Subject to any disclaimer, the term of this patent is extended or adjusted under 35 U.S.C. 154(b) by 342 days.

(21) Appl. No.: 10/528,083

(22) PCT Filed: Sep. 16, 2003

(86) PCT No.: PCT/JP03/11764

§ 371 (c)(1),
(2), (4) Date: Mar. 15, 2005

(87) PCT Pub. No.: WO2004/027256

PCT Pub. Date: Apr. 1, 2004

(65) Prior Publication Data

US 2005/0252996 A1 Nov. 17, 2005

(30) Foreign Application Priority Data

Sep. 17, 2002 (JP) ............................. 2002-269786

(51) Int. Cl.
 *F02M 47/02* (2006.01)
 *F02M 45/00* (2006.01)
 *F02M 61/06* (2006.01)
(52) U.S. Cl. ..................... 239/92; 239/88; 239/89; 239/533.4; 239/533.1; 123/1
(58) Field of Classification Search .................... 239/5, 239/88–92, 533.2–533.15; 123/1
See application file for complete search history.

(56) References Cited

U.S. PATENT DOCUMENTS 5,097,803 A * 3/1992 Galvin .......................... 123/3

(Continued)

FOREIGN PATENT DOCUMENTS

JP 2000-120493 4/2000

(Continued)

*Primary Examiner*—Kevin Shaver
*Assistant Examiner*—James S. Hogan
(74) *Attorney, Agent, or Firm*—Priest & Goldstein, PLLC

(57) ABSTRACT

An existing diesel engine vehicle of light oil fuel is enabled to run as a diesel engine vehicle using DME as fuel without exchanging a whole diesel engine and at very low cost and easily. The shape of a tip part 21 of a needle valve 2 is set by a center diameter L3 for regulating a minimum flow path area at full lift of a fuel injection nozzle 1, a seat diameter L2 of a seat part 211 coming in contact with a valve seat part 33 and blocking communication with a fuel injection hole 31, and a shaft diameter L1, and a tip end angle is about 92 degrees. The center diameter L3 is set to $\phi 2.5$ mm, the seat diameter L2 is set to $\phi 3.0$ mm, and the shaft diameter L1 is set to $\phi 3.25$ mm. The ratio of the center diameter L3 and the seat diameter L2 is L3/L2=2.5 mm/3.0 mm=about 0.833, and the ratio of the seat diameter L2 and the shaft diameter L1 is L2/L1=3.0 mm/3.25 mm=about 0.92.

5 Claims, 11 Drawing Sheets

U.S. PATENT DOCUMENTS

| | | | |
|---|---|---|---|
| 5,626,294 A * | 5/1997 | McCandless | 239/533.3 |
| 6,109,536 A * | 8/2000 | English | 239/5 |
| 6,439,192 B1 * | 8/2002 | Ouellette et al. | 123/299 |
| 6,640,754 B1 * | 11/2003 | Iida | 123/27 R |
| 2002/0152985 A1 * | 10/2002 | Wolff | 123/305 |

FOREIGN PATENT DOCUMENTS

| JP | 2001-107826 | 4/2001 |
|---|---|---|

* cited by examiner (a)

(b)

(a)

(b)

FUEL INJECTION NOZZLE FOR DME FUEL, AND DIESEL ENGINE INCLUDING THE FUEL INJECTION NOZZLE FOR DME FUEL

TECHNICAL FIELD

The present invention relates to a fuel injection nozzle for DME fuel in a diesel engine using DME (DiMethyl Ether) as fuel.

BACKGROUND ART

A conventional fuel injection nozzle of a diesel engine using light oil as fuel includes, for example, a needle valve 2 as shown in FIG. 9. As shown in FIG. 10, in a state where an outer peripheral surface of a tip part 21 of the needle valve 2 is seated on a valve seat part 33, communication of light oil fuel to a fuel injection port 31 of a nozzle body 3 is blocked and a fuel injection nozzle 1 is put in a valve closed state (for example, see JP-A-11-13576). The tip part 21 of the needle valve 2 has such a shape that the ratio of a shaft diameter L1 and a seat diameter L2 of a seat part 211 coming in contact with the valve seat part 33 becomes L2/L1=0.60 to 0.75. Besides, it has such a shape that the ratio of the seat diameter L2 and a center diameter L3 for regulating a minimum flow path area at full lift of the needle valve 2 becomes L3/L2=0.35 to 0.60. As shown in FIG. 11, the needle valve 2 is lifted in a direction denoted by reference character B, the flow path is constructed of a space produced by separation of the tip part 21 of the needle valve 2 from the valve seat part 33, and the fuel injection nozzle 1 is put in a valve open state. The needle valve 2 is regulated so that a minimum flow path area d at a time when it is lifted by a lift amount denoted by reference character D and is put in a full lift state becomes an optimum flow path area by the center diameter L3.

High pressure light oil fuel supplied from a not-shown injection pump, a common rail and the like flows into the inside of the valve seat 33, and is sprayed into a combustion chamber of the diesel engine from the fuel injection hole 31 as indicated by reference character C. The high pressure light oil fuel sprayed into the combustion chamber is burned by spontaneous ignition due to mixture with high temperature and high pressure air.

As stated above, the combustion of the diesel engine is performed in such a way that the fuel is sprayed into the high temperature and high pressure air, and the spontaneous ignition is caused by the mixture of the air and the fuel. However, atmospheric pollution by the diesel engine becomes a problem in recent years, and as measures against the atmospheric pollution, attention is paid to using DME, whose exhaust is clean, as fuel instead of the light oil. Since the DME fuel has a high cetane number and compression ignition is possible, it can be used as fuel of the diesel engine. Besides, since smoke and SOx are not contained at all in the exhaust gas, it is harmless to human beings, and there is no influence on the destruction of the ozone layer and the greenhouse effect. Further, since it is relatively easily synthesized from various raw materials other than oil, it can be mass-produced at a low cost comparable to light oil.

Accordingly, from social demands such as the environmental problem due to the exhaust gas, the exhaustion of oil resources, and the necessity of fuel diversification against an unexpected oil crisis, there is a high possibility that it is realized in near future that traveling and possession of an existing diesel engine vehicle using light oil as fuel is prohibited by regulations. Besides, at the present moment, except for DME, there is nothing more valuable than DME as an alternate fuel of a diesel engine substituting for the light oil, and a diesel engine system of the DME fuel is currently at an advanced stage of development, and accordingly, it can be said that the light oil is substituted by DME as the fuel of the diesel engine before too long.

However, as described above, although DME has many merits as the fuel of the diesel engine, as compared with the light oil, energy obtained from a same amount of fuel is low, and accordingly, when the amount of fuel injection is the same as that in the case of the light oil, an engine output becomes lower than that in the case of the light oil. Thus, a conventional diesel engine using light oil as fuel can not be used directly as a diesel engine using DME as fuel. In the case where a diesel engine using DME as fuel is designed and manufactured from the first, it is sufficient if the amount of fuel injection is set so that a specified engine output can be obtained by the DME fuel. However, in an existing diesel engine vehicle using light oil as fuel, in case the mounted whole diesel engine must be exchanged with a diesel engine of DME fuel, it takes very high cost, labor, and time, and this can not be said to be realistic. Accordingly, even if a diesel engine vehicle of DME fuel is put to practical use, the replacing of existing light oil fuel diesel engine vehicles is not smoothly carried out, and by that, the spread of the diesel engine of DME fuel is much delayed, and there is a fear that measures against the worrying destruction of the environment and global warming are delayed, and the exhaustion of oil resources is hastened.

DISCLOSURE OF THE INVENTION

The invention has been made in view of such circumstances, and its object is to enable an existing diesel engine vehicle of light oil fuel to run as a diesel engine vehicle using DME as fuel without exchanging the whole diesel engine, and at very low cost and easily.

In order to achieve the above object, according to a first aspect of the invention, a fuel injection nozzle for DME fuel, which is mounted in each combustion chamber of a light oil fuel diesel engine and is for driving the light oil fuel diesel engine by using DME fuel, includes a nozzle body having a fuel injection hole with a total injection hole area to attain an injection amount of the DME fuel which enables an engine output comparable to light oil fuel to be obtained, and a needle valve provided to be capable of reciprocating to the fuel injection hole, and is characterized in that the needle valve is lifted from a state where a tip part of the needle valve is seated on a valve seat part of the fuel injection hole and from a state where the fuel injection hole is closed, and the tip part of the needle valve is separated from the valve seat, so that a fuel flow path of the DME fuel from an inside of the nozzle body to the fuel injection hole is constructed, and the fuel flow path with a flow path area to enable an engine output characteristic comparable to the light oil fuel with respect to a lift amount of the needle valve to be obtained by the DME fuel is constructed.

In order to obtain the engine output comparable to the light oil fuel, it is necessary to increase the fuel injection amount with respect to the lift amount of the needle valve. Then, first, the total injection hole area of the fuel injection hole formed in the nozzle body, which is an injection port for injecting the DME fuel into the combustion chamber, is increased. That is, the total injection hole area of the fuel injection hole is made to have such a size that the injection amount of the DME fuel from the fuel injection hole enables the engine output comparable to the light oil fuel to be obtained. By that, the DME fuel whose amount enables the engine output comparable to the light oil to be obtained can be injected into the combustion chamber. Incidentally, in order to obtain the engine output comparable to the light oil fuel by using the DME fuel, the fuel injection amount approximately twice as large is required, and therefore, it is necessary that the fuel injection hole with the total injection hole area approximately twice as large or larger is formed the in nozzle body.

The fuel flow path of the DME fuel from the inside of the nozzle body to the fuel injection hole, which is constructed in such a manner that the needle valve is lifted and the tip part of the needle valve is separated from the valve seat part, has the flow path area to enable the engine output characteristic comparable to the light oil fuel with respect to the lift amount of the needle valve to be obtained by using the DME fuel. Thus, in the diesel engine designed to use the light oil as the fuel, the engine output comparable to the light oil fuel can be obtained by using the DME fuel without changing the outer shape of the fuel injection nozzle, the outer diameter of the needle valve and the like. Accordingly, when the fuel injection nozzle of the existing diesel engine designed to use the light oil as the fuel is exchanged for the fuel injection nozzle for DME fuel, the existing diesel engine of the light oil fuel can be directly driven as the diesel engine using DME as fuel.

By this, according to the fuel injection nozzle for DME fuel of the first aspect of the invention, when the fuel injection nozzle of the existing diesel engine designed to use the light oil as the fuel is exchanged for the fuel injection nozzle for DME fuel, the existing diesel engine of the light oil fuel can be directly driven as the diesel engine using DME as fuel. Accordingly, the operation and effect that the existing diesel engine vehicle of the light oil fuel can be made to run as the diesel engine vehicle using DME as fuel without exchanging the whole diesel engine, and at very low cost and easily.

According to a second aspect of the invention, in the first aspect, the fuel injection nozzle for DME fuel is characterized in that the tip part of the needle valve has a shape that a ratio of a center diameter L3 for regulating a minimum flow path area and a seat diameter L2 of a seat part seated on the valve seat part is L3/L2=0.70 or higher.

The ratio L3/L2 of the center diameter and the seat diameter, which is set to about 0.35 to 0.6 in the conventional diesel engine using light oil as fuel, is set to 0.70 or higher. That is, the difference between the center diameter and the seat diameter becomes small, and as the value of the center diameter/the seat diameter approaches 1, the size of the center diameter approaches the seat diameter, and the interval between the seat part coming in contact with the valve seat part and the center diameter becomes short. Accordingly, since the center diameter inevitably becomes larger than the convention needle valve, the position of the center diameter in the valve seat part in the state where the seat part is seated on the valve seat part is positioned at an inner peripheral surface of the valve seat part having an inner diameter larger than a conventional one. Accordingly, the inner diameter of the inner peripheral surface of the valve seat part, together with the center diameter, constituting the minimum flow path area at full lift becomes large, and by that, the minimum flow path area regulated by the center diameter at full lift can be increased.

By this, according to the fuel injection nozzle for DME fuel of the second aspect of the invention, since the ratio L3/L2 of the center diameter and the seat diameter is set to 0.70 or higher, the minimum flow path area at full lift regulated by the center diameter can be increased, and by that, the foregoing operation and effect of the invention of the first aspect can be obtained.

According to a third aspect of the invention, in the second aspect, the fuel injection nozzle for DME fuel is characterized in that the tip part of the needle valve has the shape that a ratio of a shaft diameter L1 of the needle valve and the seat diameter L2 is L2/L1=0.85 or higher.

The ratio L2/L1 of the shaft diameter and the seat diameter, which is set to about 0.60 to 0.70 in the conventional diesel engine using light oil as fuel, is set to 0.85 or higher in the invention. That is, the difference between the shaft diameter and the seat diameter becomes small, and as the value of the seat diameter/the shaft diameter approaches 1, the size of the seat diameter approaches the shaft diameter. Accordingly, the seat diameter becomes larger than that of the conventional needle valve, and in proportion to that, the center diameter also becomes large inevitably. Accordingly, the position of the center diameter in the valve seat part and in the state where the seat part is seated on the valve seat part is positioned at an inner peripheral surface of the valve seat part having a further large inner diameter. Accordingly, the inner diameter of the inner peripheral surface of the valve seat part, together with the center diameter, constituting the minimum flow path area at full lift becomes further large, and by that, the minimum flow area regulated by the center diameter at full lift can be further increased.

By this, according to the fuel injection nozzle for DME fuel of the third aspect of the invention, since the ratio L2/L1 of the shaft diameter and the seat diameter is set to 0.85 or higher, the minimum flow area at full lift regulated by the center diameter can be further increased, and by that, the foregoing operation and effect according to the invention of the second aspect can be obtained.

According to a fourth aspect of the invention, in any one of the first to third aspects, the fuel injection nozzle for DME fuel is characterized in that the fuel injection hole has a shape that the total injection hole area is 0.6 $mm^2$ or larger.

Since the total injection hole area of the fuel injection nozzle of the conventional diesel engine using light oil as fuel is set to about 0.3 $mm^2$ or smaller, when the total injection area is made 0.6 $mm^2$ or larger, the fuel flowing through the fuel injection hole can be increased twice or more. Accordingly, it becomes possible to obtain the engine output comparable to or higher than the light oil fuel by using the DME fuel in which as compared with the conventional light oil fuel, approximately half engine output is merely obtained when the amount of fuel is the same.

According to a fifth aspect of the invention, a diesel engine includes a fuel injection nozzle for DME fuel according to any one of the first to fourth aspects.

According to the diesel engine of the fifth aspect of the invention, in the diesel engine, especially in the existing diesel engine designed to use light oil as fuel, the foregoing operation and effect of any one of the first to fourth aspects of the invention can be obtained.

BRIEF DESCRIPTION OF THE DRAWINGS

FIG. 4 shows the needle valve of the fuel injection nozzle for DME fuel according to the invention, in which FIG. 4(a) is a front view of the needle valve and FIG. 4(b) is a front view in which a tip part of the needle valve is magnified.

FIG. 8 shows another embodiment of a fuel injection nozzle for DME fuel according to the invention, in which FIG. 8(a) is a front view of a needle valve, and FIG. 8(b) is a front view in which a tip part of the needle valve is magnified.

FIG. 9 shows a needle valve of a conventional fuel injection nozzle using light oil as fuel, in which FIG. 9(a) is a front view of a needle valve, and FIG. 9(b) is a front view in which a tip part of the needle valve is magnified.

BEST MODE FOR CARRYING OUT THE INVENTION

Hereinafter, embodiments of the invention will be described with reference to drawings while a comparison is made to a conventional fuel injection nozzle of a diesel engine using light oil as fuel.

Figure 1:
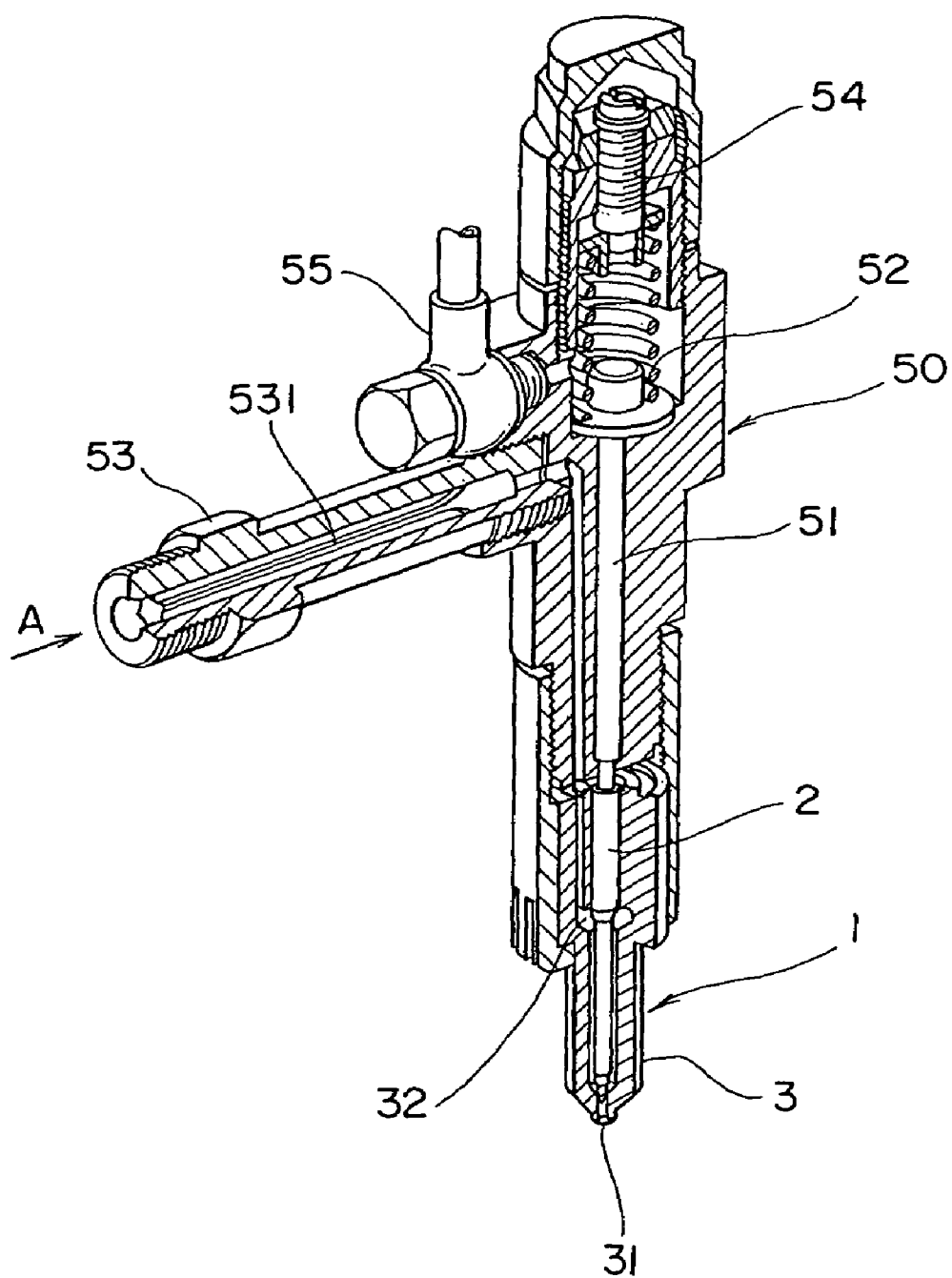
FIG. 1 is a sectional view showing a rough structure of a nozzle holder including a fuel injection nozzle for DME fuel according to the invention.

FIG. 1 is a sectional view showing a rough structure of a nozzle holder including a fuel injection nozzle as "fuel injection nozzle for DME fuel" according to the invention.

A fuel injection nozzle 1 is a long stem type hole nozzle, and is disposed in each combustion chamber of a diesel engine by a nozzle holder 50. A DME fuel pressurized to a high pressure is introduced (reference character A) into a nozzle body 3 of the fuel injection nozzle 1 from an inlet connector 53 through a filter 531. A nozzle spring 52 at an upper part of a push rod 51 regulates an injection start pressure of the fuel injection nozzle 1, and its adjustment is performed by an adjusting screw 54. Lubrication of a sliding part of the fuel injection nozzle 1 is performed by part of the DME fuel, and the DME fuel having performed the lubrication fills a receiving space of the nozzle spring 52, and is returned to a not-shown fuel tank from an overflow part 55.

Figure 2:
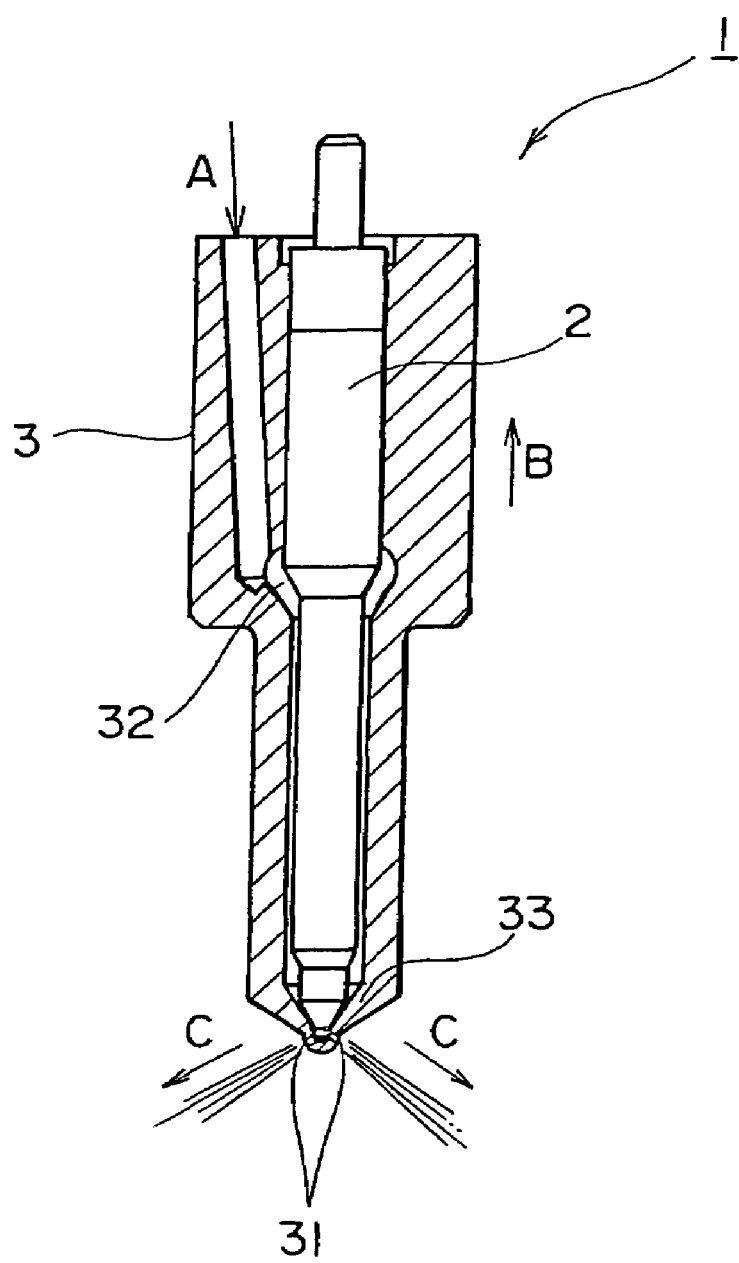
FIG. 2 is a sectional view showing a rough structure of the fuel injection nozzle for DME fuel according to the invention.
Figure 3:
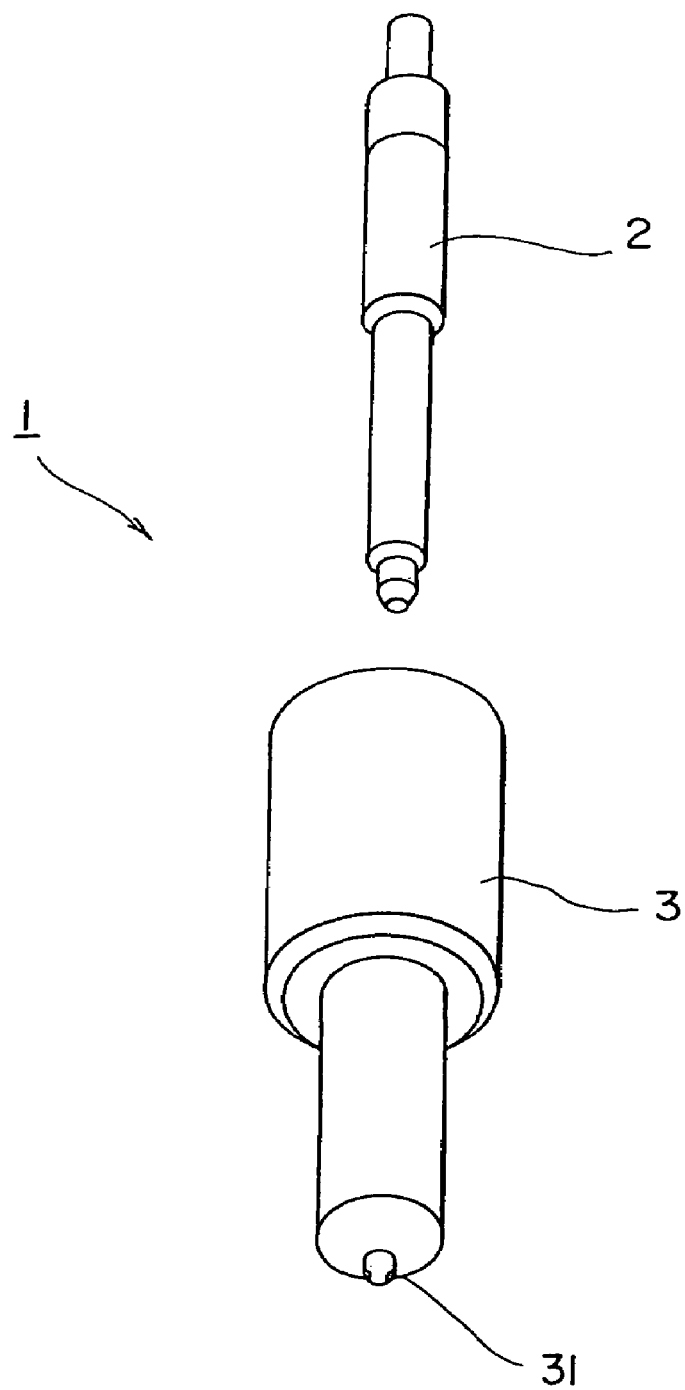
FIG. 3 is a perspective view showing outer appearances of a needle valve and a nozzle body of the fuel injection nozzle for DME fuel according to the invention.

FIG. 2 is a sectional view showing a rough structure of the fuel injection nozzle 1 according to the invention, and FIG. 3 is perspective view showing outer appearances of a needle valve 2 and the nozzle body 3 of the fuel injection nozzle 1.

As indicated by an arrow of reference character A, the high pressure DME fuel introduced from the inlet connector 53 into the inside of the fuel injection nozzle 1 through the filter 531 fills the inside of the nozzle body 3 through an oil storage chamber 32. The needle valve 2 is moved in a direction indicated by reference character B by the pressure of the DME fuel in the inside of the nozzle body 3 to open a valve, and the DME fuel is injected from a fuel injection hole 31 into the combustion chamber as indicated by an arrow of reference character C.

Figure 4:
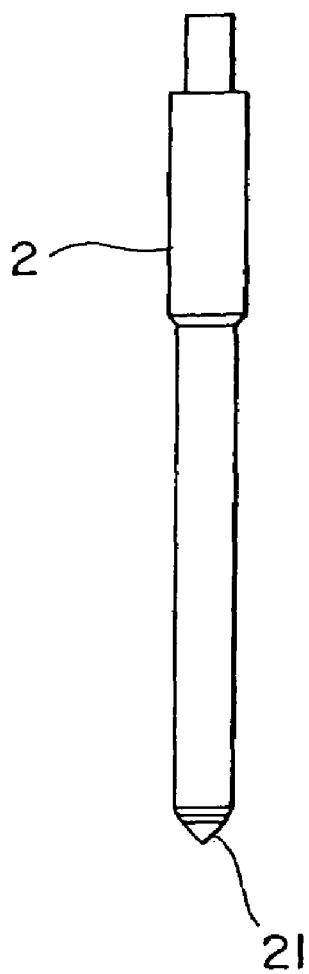
Figure 4:
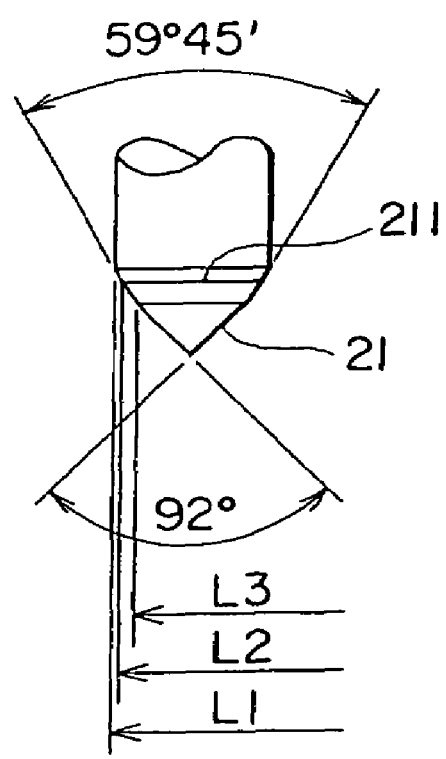
Figure 5:
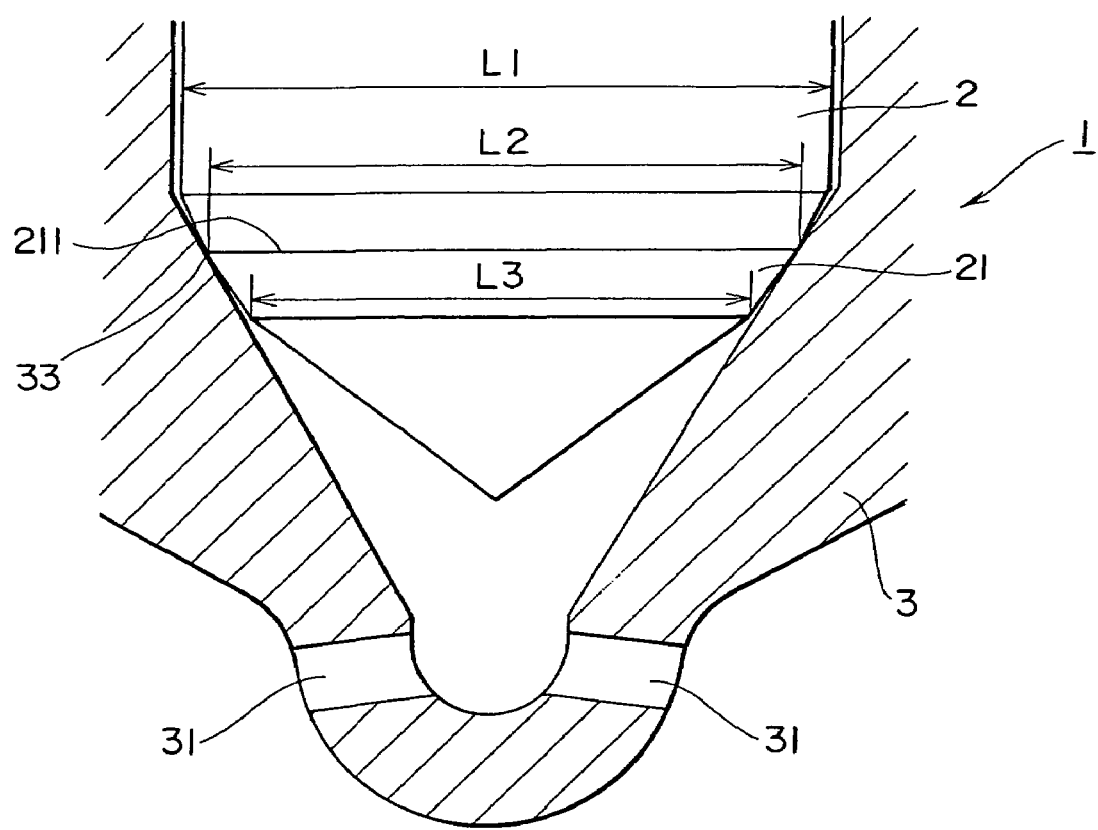
FIG. 5 is a sectional view in which a part of the fuel injection nozzle for DME fuel according to the invention is magnified and shown.

FIG. 4 shows the needle valve 2 of the fuel injection nozzle 1 of the invention, in which FIG. 4(a) is a front view of the needle valve 2, and FIG. 4(b) is a front view in which a tip part 21 of the needle valve 2 is magnified. FIG. 5 is a sectional view in which a part of the fuel injection nozzle 1 is magnified and shown.

The needle valve 2 has a substantially cylindrical shape, and the tip part 21 has a substantially right circular cone shape. The shape of the tip part 21 is set by a center diameter L3 for regulating a minimum flow path area of the fuel injection nozzle 1 at full lift, a seat diameter L2 of a seat part 211 coming in contact with a valve seat part 33 and blocking communication with the fuel injection hole 31, and a shaft diameter L1, and a tip part angle is abut 92 degrees. The center diameter L3 is set to $\phi$2.5 mm, the seat diameter L2 is set to $\phi$3.0 mm, and the shaft diameter L1 is set to $\phi$3.25 mm. The ratio of the center diameter L3 and the seat diameter L2 is L3/L2=2.5 mm/3.0 mm=about 0.833, and the ratio of the seat diameter L2 and the shaft diameter L1 is L2/L1=3.0 mm/3.25 mm=about 0.92.

In the fuel injection nozzle 1 of a valve closed state, the outer peripheral surface of the tip part 21 of the needle valve 2 urged in a state where the injection start pressure is regulated by the spring force of the nozzle spring 52 is seated on the valve seat part 33 of the nozzle body 3 as an inlet of the fuel injection hole 31 as shown in the drawing. Then, the needle valve 2 is lifted by the pressure of a predetermined amount of high pressure DME fuel sent from an injection pump and the like, so that the tip part 21 of the needle valve 2 is separated from the valve seat part 33 to form a valve open state, and the DME fuel is sent from between the tip part 21 of the needle valve 2 and the valve seat part 33 to the fuel injection hole 31.

Figure 9:
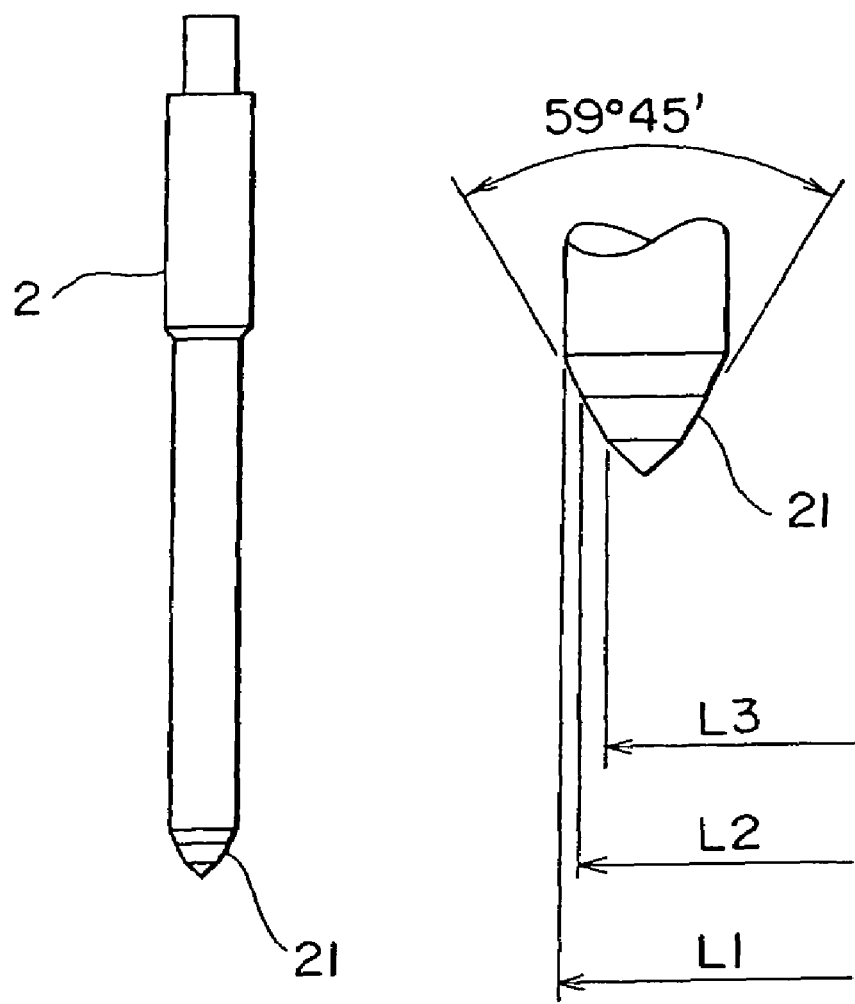
Figure 10:
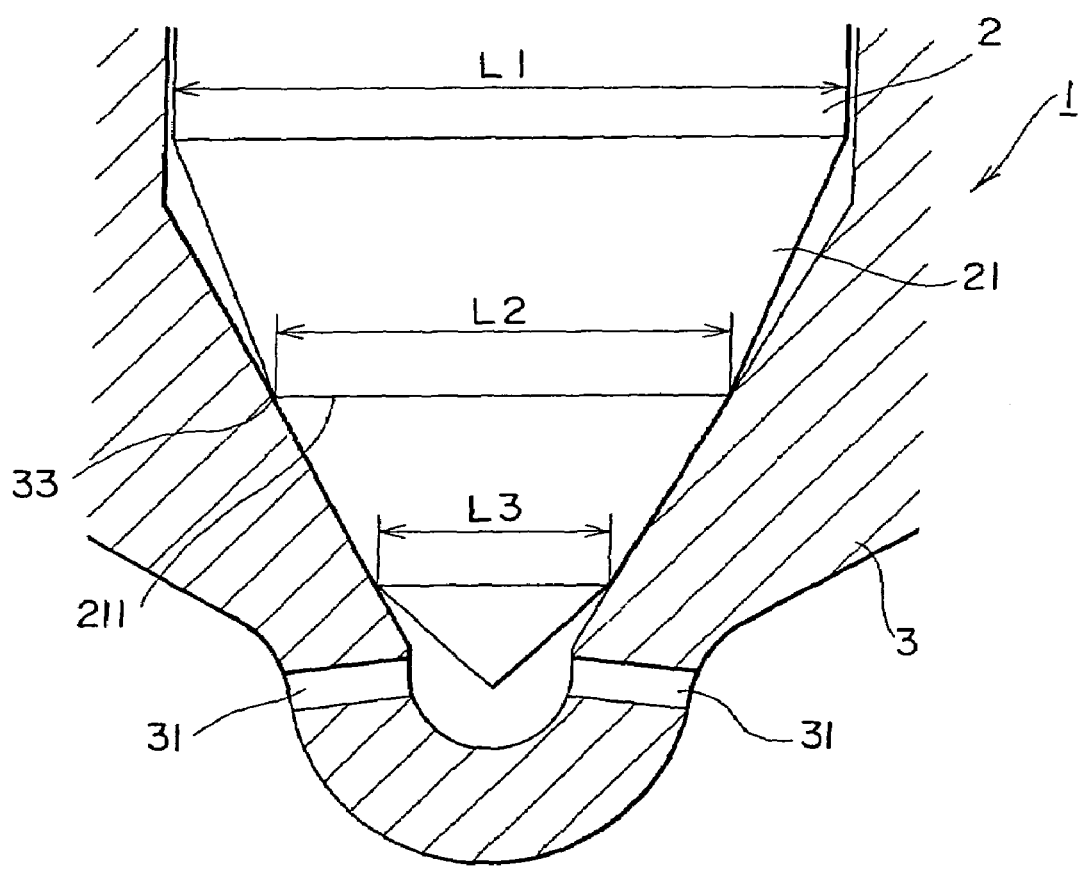
FIG. 10 is a sectional view in which a part of the fuel injection nozzle of a diesel engine using light oil as fuel is magnified and shown.

For information, in the needle valve 2 of the fuel injection nozzle 1 of the diesel engine using light oil as fuel shown in FIG. 9, the center diameter L3 is set to 1.1 mm, the seat diameter L2 is set to $\phi$2.2 mm, and the shaft diameter L1 is set to $\phi$3.25 mm. The ratio of the center diameter L3 and the seat diameter L2 is L3/L2=1.1 mm/2.2 mm=0.50, and the ratio of the seat diameter L2 and the shaft diameter L1 is L2/L1=2.2 mm/3.25 mm=about 0.68. Besides, as shown in FIG. 10, since the light oil fuel can produce an engine output larger than the DME fuel when the same amount of fuel injection is used, the total injection hole area of the fuel injection hole 31 formed in the nozzle body 3 is set to be smaller than the total injection hole area of the fuel injection hole 31 of the fuel injection nozzle 1 according to the invention.

Figure 6:
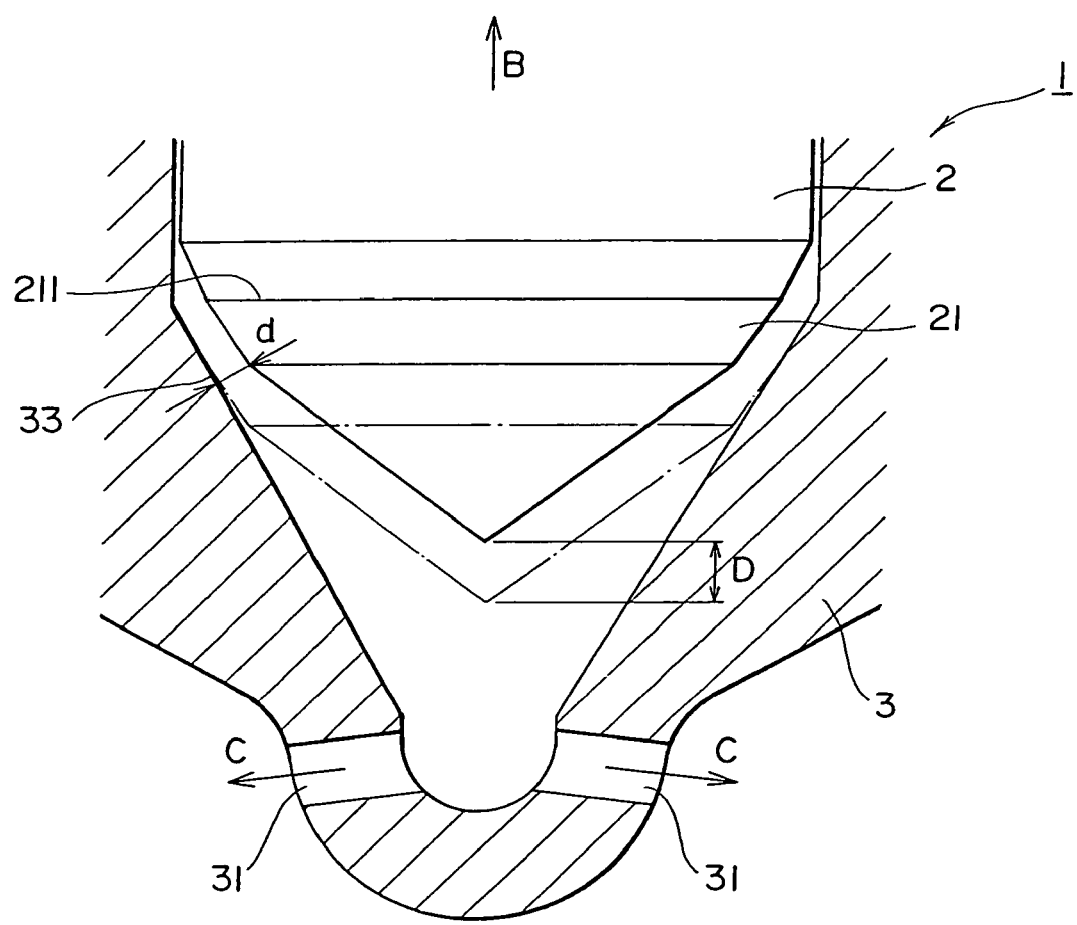
FIG. 6 is a sectional view in which the part of the fuel injection nozzle for DME fuel according to the invention is magnified and shown, and shows a state where the needle valve is lifted from a valve closed state shown in FIG. 5.

FIG. 6 is a sectional view in which a part of the fuel injection nozzle 1 of the invention is magnified and shown, and shows a state where the needle valve 2 is lifted from the valve closed state shown in FIG. 5.

The needle valve 2 is moved in the direction of the arrow denoted by reference character B and is lifted to a position of a maximum lift amount D, and at a time point when a full lift state occurs, an area of a portion where an interval between the tip part 21 of the needle valve 2 and the valve seat part 33 becomes minimum is a minimum flow path area d. Accordingly, a flow path area formed of the minimum flow path area d between the outer peripheral surface of the tip part 21 and the valve seat part 33 is a minimum flow path area. Besides, a maximum value of the fuel injection amount is determined by the total injection hole area of the fuel injection hole 31. Incidentally, in this embodiment, the maximum lift amount D at full lift of the fuel injection nozzle 1 is set to about 0.25 mm.

Figure 11:
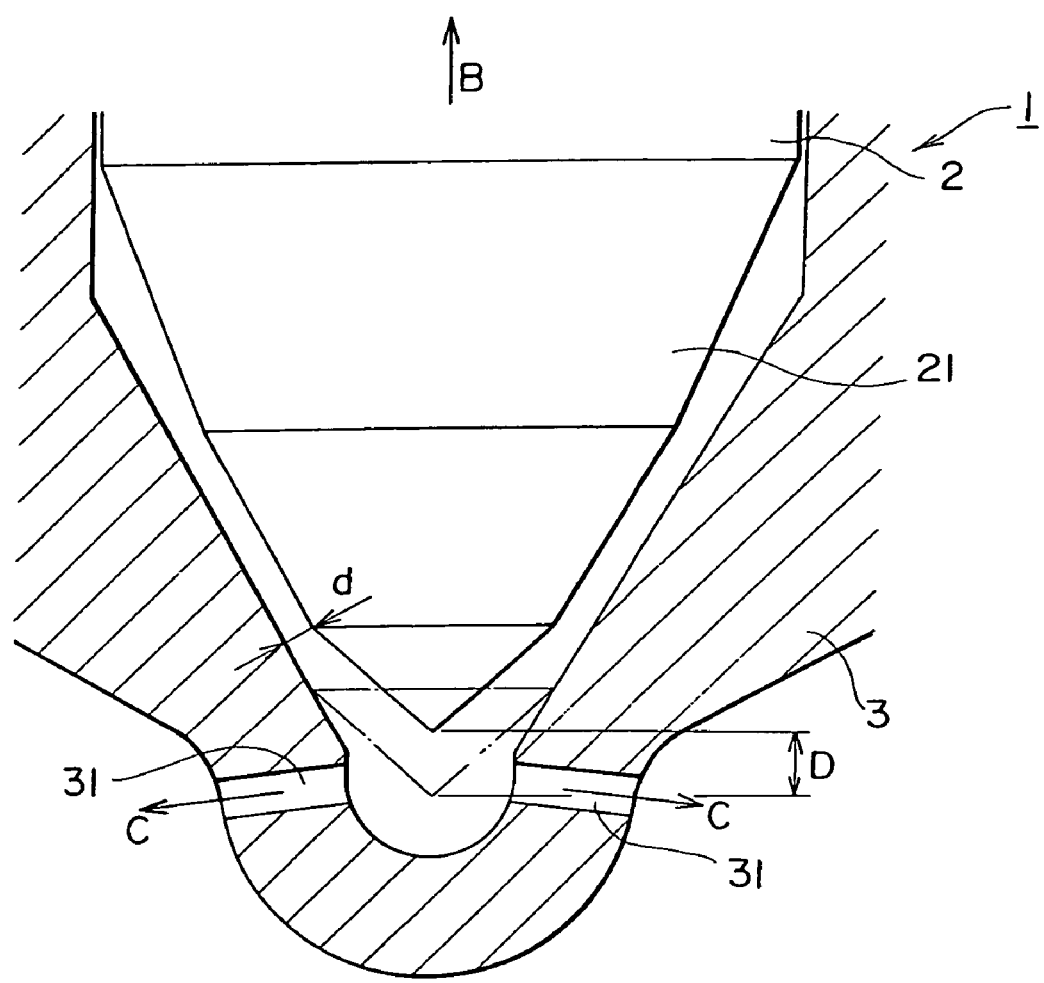
FIG. 11 is a sectional view in which the part of the fuel injection nozzle of the diesel engine using light oil as fuel is magnified and shown, and shows a state where the needle valve is lifted from a valve closed state shown in FIG. 10.

Here, as compared with the case of the fuel injection nozzle 1 of the diesel engine using light oil as fuel shown in FIG. 11, first, the size of the fuel injection hole 31 of the nozzle body 3 of the fuel injection nozzle 1 according to the invention is formed to be larger, and by that, the total injection hole area is set to become approximately twice as large. This is because, as described before, in order to obtain the same engine output as the light oil fuel by using the DME fuel, a fuel injection amount larger than the light oil fuel becomes necessary. Accordingly, by setting the total injection hole area of the fuel injection hole 31 to be larger than that in the light oil fuel, the engine output comparable to the light oil fuel can be obtained by the DME fuel.

Besides, in the tip part 21 of the needle valve 2, the ratio L3/L2 of the center diameter L3 and the seat diameter L2 is set to be as large as about 0.833 in the fuel injection nozzle 1 of the invention, while it is set to 0.50 in the conventional fuel injection nozzle 1 of the diesel engine using light oil as fuel. Besides, the ratio L2/L1 of the seat diameter L2 and the shaft diameter L1 is set to be as large as about 0.92 in the fuel injection nozzle 1 of the invention, while it is set to about 0.68 in the conventional fuel injection nozzle 1 of the diesel engine using light oil as fuel. By that, the minimum flow path area d of the fuel injection nozzle 1 of the invention at full lift is approximately twice as large as that of the conventional fuel injection nozzle 1 of the diesel engine using light oil as fuel.

As stated above, in order to obtain the fuel injection amount necessary for the DME fuel, the ratio L3/L2 of the center diameter L3 and the seat diameter L2 is made 0.7 or higher and about 0.833 in this embodiment, and the ratio of L2/L1 of the seat diameter L2 and the shaft diameter L1 is made 0.85 or higher and about 0.92 in this embodiment, so that the minimum flow path area d at full lift can be made the area approximately twice as large. Besides, by setting the hole diameter of each of the fuel injection holes 31 such that the total injection hole area becomes approximately twice as large, the fuel injection amount of the fuel injection nozzle 1 can be set to be approximately twice as large. By that, it is possible to obtain the fuel injection amount of the DME fuel which enables the engine output comparable to the light oil to be obtained.

Figure 7:
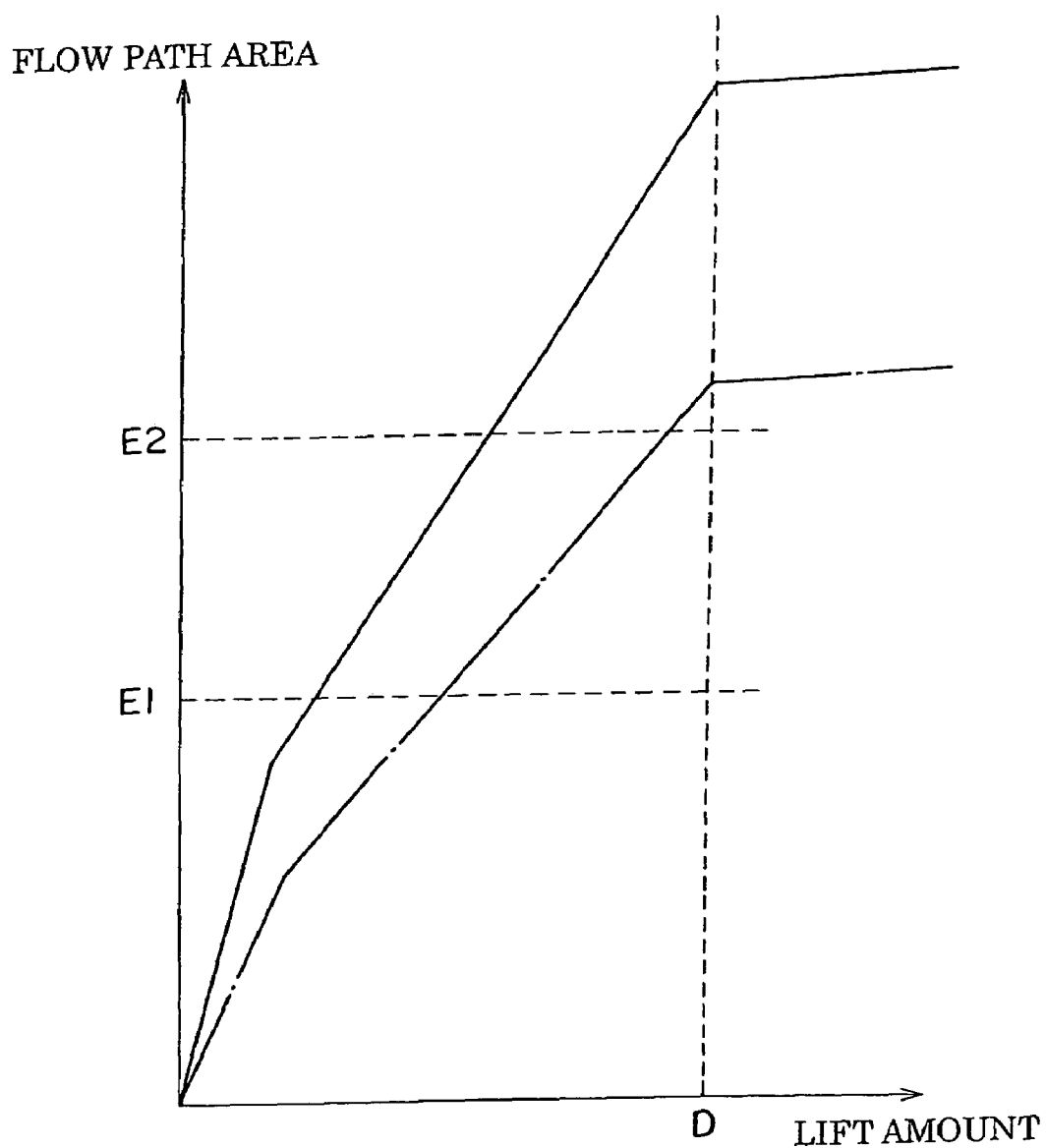
FIG. 7 is a graph schematically showing a characteristic of a flow path area with respect to a lift amount of the needle valve of the fuel injection nozzle for DME fuel according to the invention.

FIG. 7 is a graph schematically showing a characteristic of a flow path area with respect to a lift amount of the needle valve 2 of the fuel injection nozzle 1 of the invention.

The graph indicated by a solid line is the graph of the fuel injection nozzle 1 of the invention, and the graph indicated by an alternate long and short dash line is the graph of the fuel injection nozzle 1 of the diesel engine using light oil as fuel. An area denoted by reference character E1 is the total injection hole area of the fuel injection nozzle 1 of the diesel engine using light oil as fuel, and an area denoted by reference character E2 is the total injection hole area of the fuel injection nozzle 1 of the invention. The flow path area (vertical axis of the graph) is increased as shown in the drawing in proportion to the lift amount (horizontal axis of the graph) of the needle valve 2, and the flow path area characteristic of the needle valve 2 with respect to the lift amount is determined by the ratio L3/L2 of the center diameter L3 of the tip part 21 and the seat diameter L2, the ratio L2/L1 of the seat diameter L2 and the shaft diameter L1, and the total injection hole area of the fuel injection hole 31. As is apparent from the graph, in the fuel injection nozzle 1 of the invention, the flow path area with respect to the lift amount of the needle valve 2 is larger than that of the fuel injection nozzle 1 of the light oil fuel at a substantially constant ratio.

In this embodiment, the total injection hole area E2 of the fuel injection nozzle 1 of the invention is set to the total injection hole area approximately twice as large as the total injection hole area E1 of the fuel injection nozzle of the diesel engine using light oil as fuel, so that the engine output characteristic comparable to the light oil fuel can be obtained by the DME fuel. The flow path area with respect to the lift amount of the needle valve 2 is also set so that the flow path area approximately twice as large can be obtained. Accordingly, the DME fuel approximately twice as large as the light oil with respect to the lift amount of the needle valve 2 can be supplied to the combustion chamber of the diesel engine, and according to that, the total injection hole area of the fuel injection hole 31 is also set to be approximately twice as large, so that the total injection hole area of the fuel injection hole 31 does not become a bottle neck.

In this way, in the diesel engine designed to use light oil as fuel, when only the fuel injection nozzle is changed to the fuel injection nozzle 1 of this invention, the engine output characteristic comparable to the light oil fuel can be obtained by the DME fuel without changing the outer shape of the fuel injection nozzle, the shaft diameter of the needle valve 2, and the like. Thus, the existing diesel engine vehicle of the light oil fuel can be made to run as the diesel engine vehicle using DME as fuel at very low cost and easily.

Figure 8:
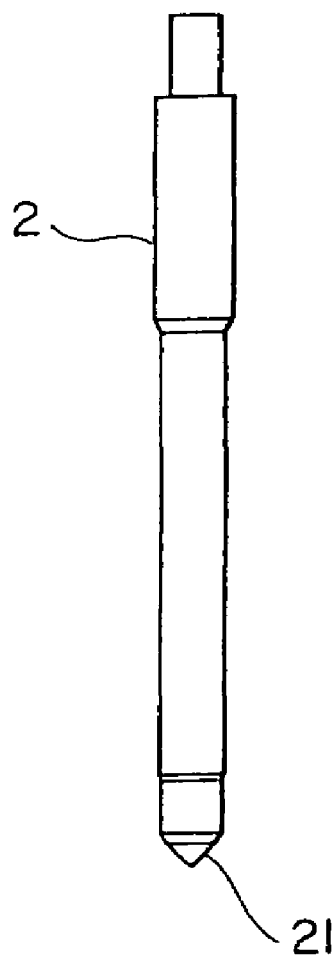
Figure 8:
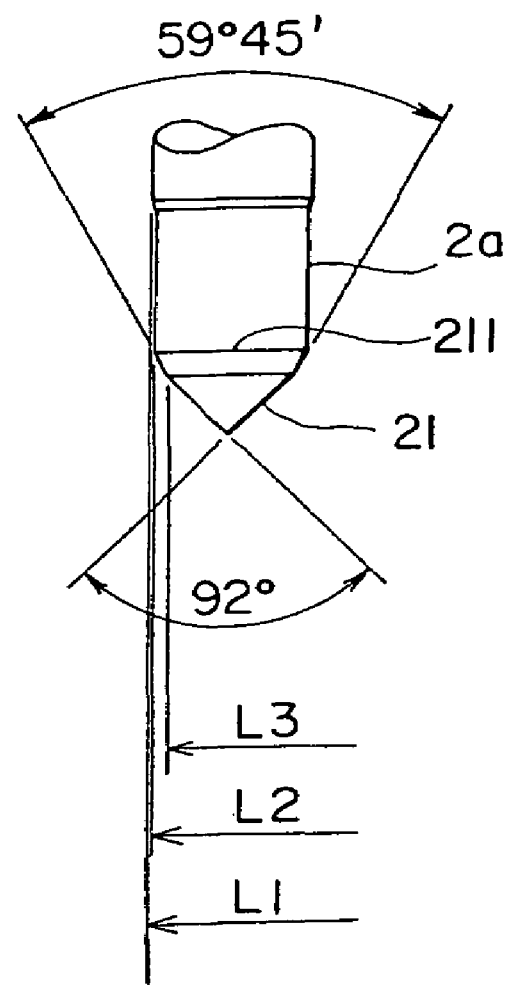

Besides, as another embodiment, in addition to the first embodiment, it is possible to cite one in which a fuel injection amount of DME fuel is further increased. FIG. 8 shows another embodiment of a fuel injection nozzle for DME fuel according to the invention, in which FIG. 8A is a front view of a needle valve 2, and FIG. 8B is a front view in which a tip part of the needle valve 2 is magnified.

Since a part (portion denoted by reference character 2a) of a shaft of the needle valve 2 is smaller than a shaft diameter L1 and has the same diameter as a seat diameter L2, an interval to a nozzle body 3 becomes wide by that, and a flow rate of DME fuel can be increased. Accordingly, it is possible to expect an effect that a diesel engine designed to use light oil as fuel can be driven at an engine output comparable to or higher than light oil by using DME fuel.

Incidentally, the invention is not limited to the above embodiments, and various modifications can be made within the scope of the invention recited in the claims. For example, the invention can be carried out also in a hole nozzle which is not a long stem type, and it is needless to say that those are also contained in the scope of the invention.

According to the invention, the existing diesel engine vehicle of the light oil fuel can be made to run as the diesel engine vehicle using DME fuel as fuel without exchanging the whole diesel engine, and at very low cost and easily.

INDUSTRIAL APPLICABILITY

The present invention can be used as a fuel injection nozzle for DME fuel in a diesel engine using DME (DiMethyl Ether) as fuel.

The invention claimed is:

1. A fuel injection nozzle for DME fuel, which is mounted in each combustion chamber of a light oil fuel diesel engine and is for driving the Light oil fuel diesel engine by using DME fuel, comprising:

a nozzle body having a fuel injection hole with a total injection hole area to attain an injection amount of the DME fuel which enables an engine output comparable to light oil fuel to be obtained; and a needle valve provided to be capable of reciprocating to the fuel injection hole and having a tip part of a substantially right circular cone shape, characterized in that the needle valve is configured to form a valve closed state as the tip part is seated on a valve seat part of the nozzle body at a position before the fuel injection hole, and to form a valve open state as the tip part is lifted to be separated from the valve seat part, and the needle valve is lifted from the valve closed state to shift into the valve open state, so that a fuel flow path of the DME fuel from an inside of the nozzle body to the fuel injection hole is defined, the tip part of a substantially right circular cone shape, of the needle valve has a shape set by a center diameter for defining a minimum flow path area of the fuel flow oath defined as a minimum interval between the needle valve at full lift and the valve seat part, a seat diameter of a seat part which is positioned on a root side with respect to the center diameter and is for coming in contact with the valve seat part and blocking communication with the fuel injection hole, and a shaft diameter of a needle valve body, and the tip part of the needle valve is shaped such that a size of the center diameter is made closer to that of the seat diameter by positioning the center diameter closer to the seat diameter, to such a degree that an injection amount of the DME fuel which enables an engine output characteristic comparable to light oil fuel to be obtained is attained with the minimum flow path area of the fuel flow path defined by the center diameter with the needle valve at full lift, according to the total injection hole area of the fuel injection hole.

2. The fuel injection nozzle for DME fuel according to claim 1, characterized in that the tip part of the needle valve is shaped such that the size of the center diameter is made closer to that of the seat diameter by positioning the center diameter closer to the seat diameter, and such that the size of the seat diameter is made closer to that of the shaft diameter by positioning the seat diameter closer to the shaft diameter, to such a degree in total that an injection amount of the DME fuel which enables an engine output characteristic comparable to light oil fuel to be obtained is attained with the minimum flow path area of the fuel flow path defined by the center diameter with the needle valve at full lift, according to the total injection hole area of the fuel injection hole.

3. The fuel injection nozzle for DME fuel according to claim 2, characterized in that the tip part of the needle valve has a shape that a ratio of the center diameter to the seat diameter is 0.70 or higher, and that a ratio of the seat diameter to the shaft diameter is 0.85 or higher.

4. The fuel injection nozzle for DME fuel according to claim 3, characterized in that the fuel injection hole has a shape that the total injection hole area is 0.6 mm$^2$ or larger.

5. A diesel engine comprising a fuel injection nozzle, characterized in that the fuel injection nozzle is the fuel injection nozzle for DME fuel according to any one of claims 1 to 4.

* * * * *